United States Patent
Song et al.

(10) Patent No.: US 9,549,102 B2
(45) Date of Patent: Jan. 17, 2017

(54) METHOD AND APPARAUTS FOR IMPLEMENTING ACTIVE IMAGING SYSTEM

(71) Applicant: ELECTRONICS AND TELECOMMUNICATIONS RESEARCH INSTITUTE, Daejeon (KR)

(72) Inventors: Jung Ho Song, Daejeon (KR); Bong Ki Mheen, Daejeon (KR); Myoung Sook Oh, Daejeon (KR); Yong Hwan Kwon, Daejeon (KR); Dong Sun Kim, Yeongju-si (KR); Hong Seok Seo, Daejeon (KR); Min Hyup Song, Daejeon (KR); Jae Sik Sim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 33 days.

(21) Appl. No.: 14/609,872

(22) Filed: Jan. 30, 2015

(65) Prior Publication Data
US 2015/0381962 A1 Dec. 31, 2015

(30) Foreign Application Priority Data
Jun. 27, 2014 (KR) ........................ 10-2014-0080001

(51) Int. Cl.
*H04N 1/04* (2006.01)
*H04N 5/225* (2006.01)
(Continued)

(52) U.S. Cl.
CPC ............ *H04N 5/225* (2013.01); *H04N 5/2354* (2013.01); *H04N 5/23238* (2013.01)

(58) Field of Classification Search
CPC ... G02B 27/022; G02B 27/2278; G03B 15/12; G03B 25/00; G03B 35/18; G06K 2209/01; G06K 9/3258; G06K 9/40; G06T 3/4053; G06T 11/00; G06T 15/20; H04N 13/042; H04N 13/0495; H04N 13/0497
(Continued)

(56) References Cited

U.S. PATENT DOCUMENTS 6,097,430 A * 8/2000 Komiya ................. H04N 1/195
348/218.1
6,148,118 A * 11/2000 Murakami ........... H04N 1/3876
358/450
(Continued)

FOREIGN PATENT DOCUMENTS

KR 10-2013-0140554 A 12/2013

OTHER PUBLICATIONS

Richmond et al., "Laser radar focal plane array for three-dimensional imaging", Laser Radar Technology and Applications, Proc. SPIE vol. 2748, pp. 61-67, Jun. 26, 1996.

*Primary Examiner* — Negussie Worku
(74) *Attorney, Agent, or Firm* — Rabin & Berdo, P.C.

(57) ABSTRACT

Disclosed are a method and an apparatus for implementing an active imaging system. A method of obtaining an image in an active imaging system including: dividing an imaging region, and determining a plurality of divided imaging regions; scanning each of the plurality of divided imaging regions based on a laser; collecting reflected light for each of the plurality of divided imaging regions, and generating a plurality of divided images by an image sensor; and generating a whole image for the imaging region based on the plurality of divided images.

8 Claims, 6 Drawing Sheets

(51) Int. Cl.
*H04N 5/232* (2006.01)
*H04N 5/235* (2006.01)

(58) Field of Classification Search
USPC ........ 358/530, 450; 382/284, 299, 176, 187,
382/229, 294; 345/1.1, 1.3, 419;
348/E7.001, 348/36, 51
See application file for complete search history.

(56) References Cited

U.S. PATENT DOCUMENTS

| | | | | |
|---|---|---|---|---|
| 6,674,889 | B1* | 1/2004 | Takayama | G01N 21/95607 348/130 |
| 8,547,602 | B2* | 10/2013 | Suzuki | H04N 1/387 358/448 |
| 8,836,610 | B2* | 9/2014 | Jang | G06F 3/1446 345/1.1 |
| 2005/0190420 | A1* | 9/2005 | Imai | G02B 26/123 359/210.1 |
| 2009/0066814 | A1* | 3/2009 | Miyata | H04N 5/23238 348/231.99 |
| 2009/0195639 | A1 | 8/2009 | Totoda et al. | |
| 2010/0149557 | A1* | 6/2010 | Naruse | H04N 1/3876 358/1.6 |
| 2012/0075427 | A1 | 3/2012 | Yahav et al. | |
| 2013/0287339 | A1* | 10/2013 | Song | G02B 6/32 385/33 |
| 2014/0211565 | A1* | 7/2014 | Song | G11C 11/5628 365/185.03 |
| 2014/0226130 | A1* | 8/2014 | Everett | A61B 3/113 351/210 |
| 2014/0240691 | A1 | 8/2014 | Mheen et al. | |
| 2015/0009485 | A1* | 1/2015 | Mheen | G01S 17/87 356/4.01 |
| 2015/0110469 | A1* | 4/2015 | Ushiyama | H04N 21/2662 386/241 |
| 2015/0113582 | A1* | 4/2015 | Ushiyama | H04N 21/2662 725/115 |
| 2015/0381962 | A1* | 12/2015 | Song | H04N 13/0214 348/49 |
| 2016/0093388 | A1* | 3/2016 | Song | G11C 16/26 365/185.12 |

* cited by examiner

METHOD AND APPARAUTS FOR IMPLEMENTING ACTIVE IMAGING SYSTEM

CROSS-REFERENCE TO RELATED APPLICATION

This application is based on and claims priority from Korean Patent Application No. 10-2014-0080001, filed on Jun. 27, 2014, with the Korean Intellectual Property Office, the disclosure of which is incorporated herein in its entirety by reference.

BACKGROUND

1. Field

The present invention relates to an imaging system, and more particularly, to a method and an apparatus for implementing an active imaging system.

2. Discussion of Related Art

In general, an imaging system may be divided into an active imaging system and a passive imaging system. The passive imaging system photographs an image with a camera by using natural light and the like, and the active imaging system, by contrast, additionally uses a light source, such as laser, and photographs an object by using reflection of light of the light source reflected by the object. The active imaging has an advantage in that imaging is available despite of strong light of a headlight of a vehicle at night, and bad weather. Particularly, a laser radar system may obtain a 3D image, in which even position location of an object may be recognized, by irradiating pulse light, and measuring a Time Of Flight (TOF) of the returned pulse.

An imaging system technology may be utilized in various industrial fields, such as national defense, vehicle, and security fields, and the like.

For example, an imaging system based on a 3D laser image sensor in a national defense field helps easy guard and watch of a border and a coastline, and is mounted in a military weapon system, such as a tank, an aircraft, a helicopter, and a missile to be utilized for watch and trace a long-distance target. In contrast to an infra-red (IR) imaging system mainly used for detection and watch in a current national defense field, the imaging system based on laser may easily identify an object, which does not generate heat, thereby coming into the spotlight as a replacement technology. Further, the imaging system technology may be essentially utilized in developing an unmanned autonomous vehicle, which Google takes a lead, in relation to a vehicle field. California in USA where a head office of Google is located authorizes use of a road by an unmanned autonomous vehicle, and an era of an unmanned vehicle for seniors, disabled people, and drinkers begins in earnest. A core sensor of the unmanned autonomous vehicle is also the 3D laser image sensor.

In addition, the 3D laser radar image system may be utilized in various fields, such as establishment of a security system of a main geographical feature and building, and development of an intelligent robot.

SUMMARY

The present invention has been made in an effort to provide a method of implementing an active imaging system.

Further, the present invention has been made in an effort to provide an apparatus for implementing an active imaging system.

An exemplary embodiment of the present invention provides a method of obtaining an image in an active imaging system, including: dividing an imaging region, and determining a plurality of divided imaging regions; scanning each of the plurality of divided imaging regions based on a laser; collecting reflected light for each of the plurality of divided imaging regions, and generating a plurality of divided images by an image sensor; and generating a whole image for the imaging region based on the plurality of divided images. The plurality of divided imaging regions may include a first divided imaging region, a second divided imaging region, and a third divided imaging region, the plurality of divided images may include a first divided image for the first divided imaging region, a second divided image for the second divided imaging region, and a third divided image for the third divided imaging region, the first divided image may be generated by irradiating a beam at a plurality of angles corresponding to the first divided imaging region by the laser, and collecting the reflected light through a prism and a lens by an image sensor, the second divided image may be generated by irradiating a beam at a plurality of angles corresponding to the second divided imaging region by the laser, and collecting the reflected light to through the prism and the lens by the image sensor, and the third divided image may be generated by irradiating a beam at a plurality of angles corresponding to the third divided imaging region by the laser, and collecting the reflected light through the prism and the lens by the image sensor. The plurality of divided imaging regions may be a plurality of beam spots, and the plurality of beam spots may be determined according to the number of pixels and disposition of an image, which an image generating unit desires to obtain. The plurality of divided imaging regions may be a plurality of beam spots, and a divided image for each of the plurality of beam spots may be obtained through a first lens, a micro lens array, a second lens, and the image sensor, light incident through the first lens may be refracted to be incident to one micro lens included in the micro lens array, the micro lens may refract the incident light to be parallel to a center axis of the active imaging system, and the second lens may make the light refracted from the micro lens be focused to the image sensor. The image sensor may be formed of a plurality of pixels, and obtain the divided image from the imaging region according to the scanning angle of the laser.

Another exemplary embodiment of the present invention provides an active imaging system, including: an image dividing unit configured to divide an imaging region, and determine a plurality of divided imaging regions; a laser configured to scan each of the plurality of divided imaging regions; and an image generating unit configured to collect reflected light for each of the plurality of divided imaging regions and generate a plurality of divided images by an image sensor, and generate a whole image for the imaging region based on the plurality of divided images. The plurality of divided imaging regions may include a first divided imaging region, a second divided imaging region, and a third divided imaging region, the plurality of divided images may include a first divided image for the first divided imaging region, a second divided image for the second divided imaging region, and a third divided image for the third divided imaging region, the first divided image may be generated by irradiating a beam at a plurality of angles corresponding to the first divided imaging region by the laser, and collecting the reflected light through a prism and a lens by an image sensor, the second divided image may be generated by irradiating a beam at a plurality of angles corresponding to the second divided imaging region by the laser, and collecting the reflected light to through the prism and the lens by the image sensor, and the third divided image may be generated by irradiating a beam at a plurality of angles corresponding to the third divided imaging region by the laser, and collecting the reflected light through the prism and the lens by the image sensor. The plurality of divided imaging regions may be a plurality of beam spots, and the plurality of beam spots may be determined according to the number of pixels and disposition of an image, which an image generating unit desires to obtain. The plurality of divided imaging regions may be a plurality of beam spots, and a divided image for each of the plurality of beam spots may be obtained through a first lens, a micro lens array, a second lens, and the image sensor, light incident through the first lens may be refracted to be incident to one micro lens included in the micro lens array, the micro lens may refract the incident light to be parallel to a center axis of the active imaging system, and the second lens may make the light refracted from the micro lens be focused to the image sensor. The image sensor may be formed of a plurality of pixels, and obtain the divided image from the imaging region according to the scanning angle of the laser.

As described above, when the method and apparatus for implementing the active imaging system according to the exemplary embodiment of the present invention are used, a region of interest is divided, and the divided regions are imaged by one image sensor by using a prism or a micro lens array, thereby implementing a small and simple image sensor. That is, the imaging system using the laser irradiation adopting the scanning method may provide a wide FOV, and fabricate a small and simple image sensor without decreasing an intensity of a light output.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which.

DETAILED DESCRIPTION

Figure 1:
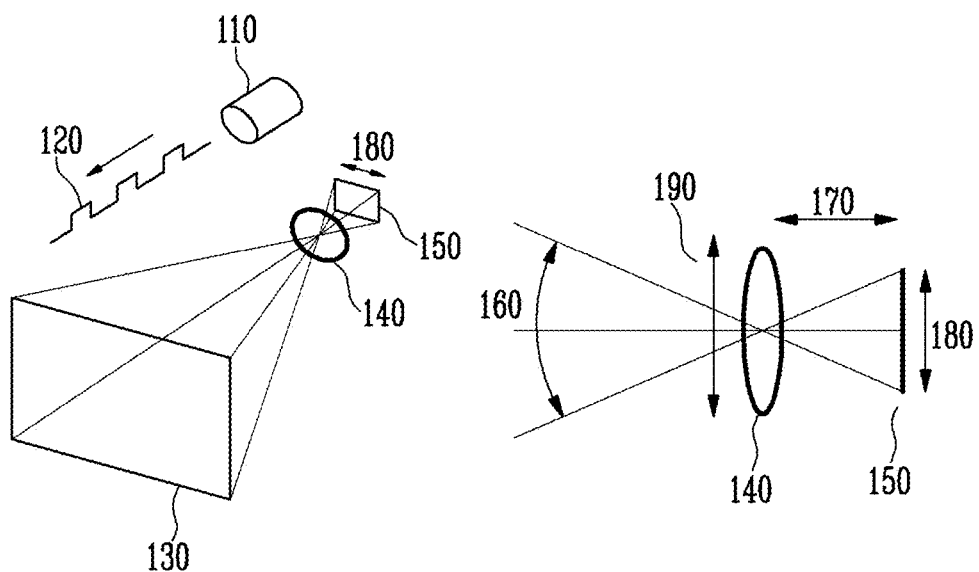
FIG. 1 is a conceptual diagram illustrating an active imaging system.

The present invention may have various modifications and various exemplary embodiments and specific exemplary embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

Terminologies such as first or second may be used to describe various components but the components are not limited by the above terminologies. The terms are used only to discriminate one constituent element from another constituent element. For example, without departing from the scope of the invention, a first constituent element may be named as a second constituent element, and similarly a second constituent element may be named as a first constituent element. A term "and/or" includes a combination of multiple relevant described items or any one of the multiple relevant described items. It should be understood that when one constituent element referred to as being "coupled to" or "connected to" another constituent element, one constituent element can be directly coupled to or connected to the other constituent element, but intervening elements may also be present. By contrast, when one constituent element is "directly coupled to" or "directly connected to" another constituent element, it should be understood that there are no intervening element present.

Terms used in the present application are used only to describe specific exemplary embodiments, and are not intended to limit the present invention. Singular expressions used herein include plurals expressions unless they have definitely opposite meanings. In the present invention, it should be understood that term "include" indicates that a feature, a number, a step, an operation, a component, a part or the combination thoseof described in the specification is present, but does not exclude a possibility of presence or addition of one or more other features, numbers, steps, operations, components, parts or combinations, in advance.

Hereinafter, an exemplary embodiment of the present invention will be described in detail with reference to the accompanying drawings. Like reference numerals refer to like elements even though like elements are shown in different drawings, and an overlapping description of the same constituent element will be omitted.

In general, an imaging system may be divided into an active imaging system and a passive imaging system. The passive imaging system photographs an image with a camera by using natural light and the like, and the active imaging system, by contrast, additionally uses a light source, such as laser, and photographs an object by using reflection of light of the light source reflected by the object. The active imaging has an advantage in that imaging is available despite of strong light of a headlight of a vehicle at night, and bad weather. Particularly, a laser radar system may obtain a 3D image, in which even position location of an object may be recognized, by irradiating pulse light, and measuring a Time Of Flight (TOF) of the returned pulse.

FIG. 1 is a conceptual diagram illustrating an active imaging system.

The active imaging system of FIG. 1 may include a laser and an image generating unit. The laser may irradiate a beam to an imaging region (a region of which an image is desired to be generated). The image generating unit may include a camera lens, an image sensor, and the like. The camera lens and the image sensor of the image generating unit may receive reflected light of a laser beam and generate an image.

The laser 110 may generate pulse light 120. The pulse light 120 generated by the laser 110 may be irradiated to an imaging region 130. For example, the pulse light 120 generated by the laser 110 may be reflected from the imaging region to generate reflected light. The reflected light may be collected to the image sensor 150 by the camera lens 140 to be detected.

A particular implementation example in which the active imaging system is used (for example, a laser radar for a vehicle) may demand of a wide Field Of View (FOV) of the image generating unit. The FOV, which is a field of view of a scene captured by the camera lens, may be a range of an object which may be photographed by the camera lens.

The FOV (θ) 160 of the camera lens may be determined by a focal distance (f) 170 of the lens and a size (H) 180 of the image sensor, and may be defined by Equation 1 below.

$$\tan(\theta/2) = H/2f \qquad \text{<Equation 1>}$$

A large image sensor having a short focal distance and a relatively large number of pixels may be used so that the image generating unit has the FOV with a large value. However, in order for the image generating unit of the active imaging system based on the laser radar to generate an image having the FOV with a large value, the laser 110 needs to first irradiate the pulse light 120 of the laser 110 to a wide region corresponding to the FOV with the large value.

The highest output of the usable beam 120 of the laser has a limit due to cost and a heat problem. When the laser beam with a predetermined output is irradiated to a wide area, an intensity of light per a unit area is decreased, and an intensity of light reflected from the imaging region and detected by the image sensor is greatly decreased. Accordingly, there is technical and cost difficulty in irradiating a laser beam to a wide region corresponding to the FOV with a large value.

Further, in order to increase the intensity of the beam detected by the image sensor, a size of an aperture (D) 190 of the camera lens needs to be large, and in this case, there is a following problem. f# of the lens is a value obtained by dividing a focal distance by a size of an aperture (f#=f/D) As f# is small, the size of the aperture at the same focal distance is large, so that an intensity of received light is increased. However, it is considerably difficult to make f# of the lens have a value equal to or lower than 1.2, and thus a lens having a small focal distance has a small size of the aperture 190 in order to have the FOV with a large value, so that an intensity of received light becomes very small.

An output of a light source is very important for the active image, compared to the passive imaging using natural light. In general, an intensity of an output of the light reflected from a far distant object is decreased proportionally to a square of a distance. Accordingly, in order to perform imaging on a far distant object, a laser with a high output is demanded. There is a limit in cost, power consumption, a heat problem, and the like for increasing an output of the laser.

Hereinafter, in the exemplary embodiment of the present invention, a method of providing a wide FOV by the active imaging system without increasing an output of a laser will be disclosed. Further, a method of fabricating a small and simple image sensor without decreasing an intensity of reflected light received in the image generating unit will be disclosed.

Figure 2A:
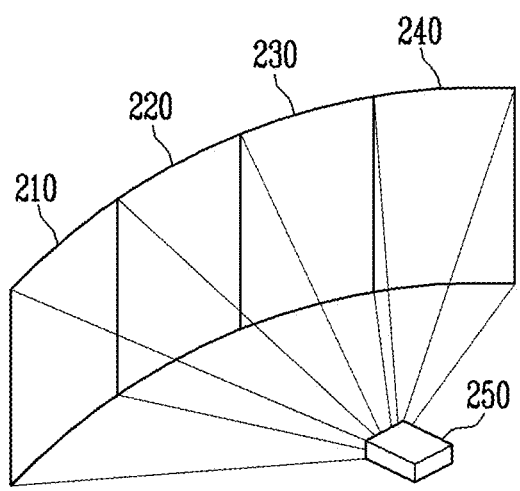
FIGS. 2A and 2B are conceptual diagrams illustrating a laser irradiation method by an active imaging system according to an exemplary embodiment of the present invention.
Figure 2B:
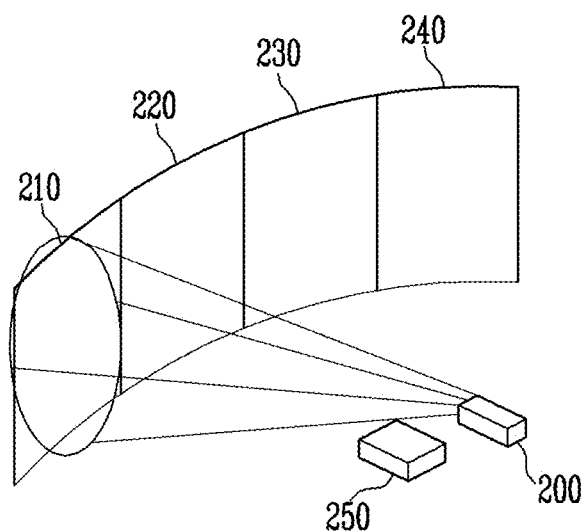

FIGS. 2A and 2B are conceptual diagrams illustrating a laser irradiation method by the active imaging system according to an exemplary embodiment of the present invention.

FIG. 2A illustrates a method of receiving, by an image generating unit 250, reflected light reflected from imaging regions 210, 220, 230, and 240, from which images are desired to be obtained by the active imaging system. The laser may irradiate a beam to all of the imaging regions 210, 220, 230, and 240. The image generating unit of the active image system may receive reflected light from all of the imaging regions 210, 220, 230, and 240 to which the laser irradiates the beam. When the output of the laser is limited to a predetermined range as described above, an intensity of light per searching region (or an intensity of light per unit area) of the laser beam may be decreased as the imaging region is widened. In this case, an intensity of the light (or an intensity of the beam) reflected from the imaging region and obtained by the image sensor of the imaging generating unit is also decreased, so that performance of the active imaging system may be decreased. In order to solve the problem, a method of dividing an imaging region and irradiating a laser beam to a divided imaging region may be used in the exemplary embodiment of the present invention.

FIG. 2B is a conceptual diagram illustrating the active imaging system irradiating a laser beam to a divided imaging region according to the exemplary embodiment of the present invention.

Referring to FIG. 2B, an intensity of the beam per unit area may be increased by irradiating a laser beam 200 only to a partial imaging region (divided imaging region) 210 among the entire imaging regions 210, 220, 230, and 240.

The scanning may be performed on the imaging region by sequentially irradiating the beam to the respective divided imaging regions 210, 220, 230, and 240 while the laser 200 rotates. The image generating unit 250 may have a wide FOV with which all of the imaging regions 210, 220, 230, and 240 to which the laser irradiates beam while rotating may be viewed. The image generating unit 250 may view all of the regions, so that the image generating unit 250 needs not to mechanically move along a direction in which the laser 200 irradiates the beam while rotating. That is, when the laser 200 irradiates the beam to each of the divided imaging regions, the image generating unit 250 may obtain reflected light reflected from each of the divided imaging regions, and obtain images for the entire imaging regions 210, 220, 230, and 240.

Figure 3:
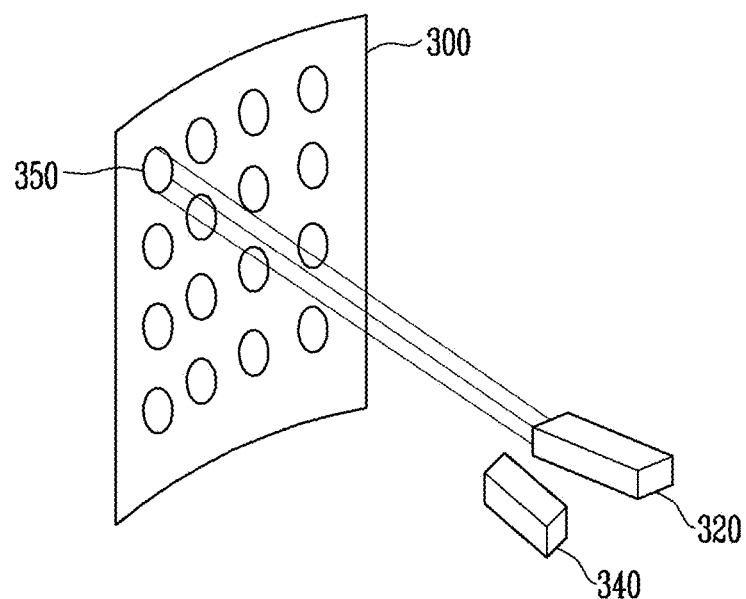
FIG. 3 is a conceptual diagram illustrating a laser irradiation method by an active imaging system according to an exemplary embodiment of the present invention.

FIG. 3 is a conceptual diagram illustrating a laser irradiation method by the active imaging system according to an exemplary embodiment of the present invention.

FIG. 3 discloses a method of obtaining an image by an image generating unit 340 by setting, by a laser, beam spots 350 for an imaging region 300 and irradiating a beam to the beam spots 350.

Referring to FIG. 3, a laser 320 may set the beam spots 350 according to an image which the image generating unit 340 desires to obtain. For example, the laser 320 may set the beam spots 350 for the imaging region 300 according to the number of pixels and displacement of an image which the image generating unit 340 desires to obtain. FIG. 3 illustrates an example of the case where the laser 320 sets 4×4 beam spots 350 for the imaging region 300.

The laser 320 may sequentially irradiate a beam to each of the beam spots 350, and the image generating unit 340 may receive reflected light reflected from each of the beam spots 350, and generate a whole image for the imaging region 300. By using the aforementioned method, it is possible to perform imaging on a far distant object with a relatively low output. Here, the FOV of the image generating unit is large to view the entire imaging region 300, so that the image generating unit needs not to mechanically move according to scanning the divided imaging region (beam spot) of the laser 320.

A multiple of a size of an aperture and a radiation angle is uniformly maintained in an optical system by the Etendue conservation law. That is, a multiple of a size of an aperture and a value of a cosine function of an en quad of the FOV. When it is assumed that the FOV of the image sensor itself is 180°, a relationship represented by Equation 2 below is formed between the size (D) of the aperture of the lens, the FOV (θ) of the lens, and the size (H) of the image sensor according to the Etendue conservation law.

$$D \cdot \cos\left(\frac{\theta}{2}\right) = H \qquad <\text{Equation 2}>$$

When the imaging system scans the region having the smaller FOV than an available FOV with the laser as illustrated in FIGS. 2 and 3, it is enough for the image generating unit to obtain only the reflected light reflected from the part to which the beam of the laser is irradiated, so that a demanded substantial FOV of a light receiving optical system is much small. Accordingly, the size (H) of the image sensor may be much small when light having the same intensity is received with the same size (D) of the aperture. For example, when the partial imaging region is determined by dividing the imaging regions into four regions as illustrated in FIG. 2, the size of the image sensor may be generated with a size of ¼ of the image sensor. When the beam spots are set for the imaging region as illustrated in FIG. 3, the size of the image sensor may be decreased based on (area of one spot/total area of beam spots) or (1/the total number of beam spots).

Figure 4:
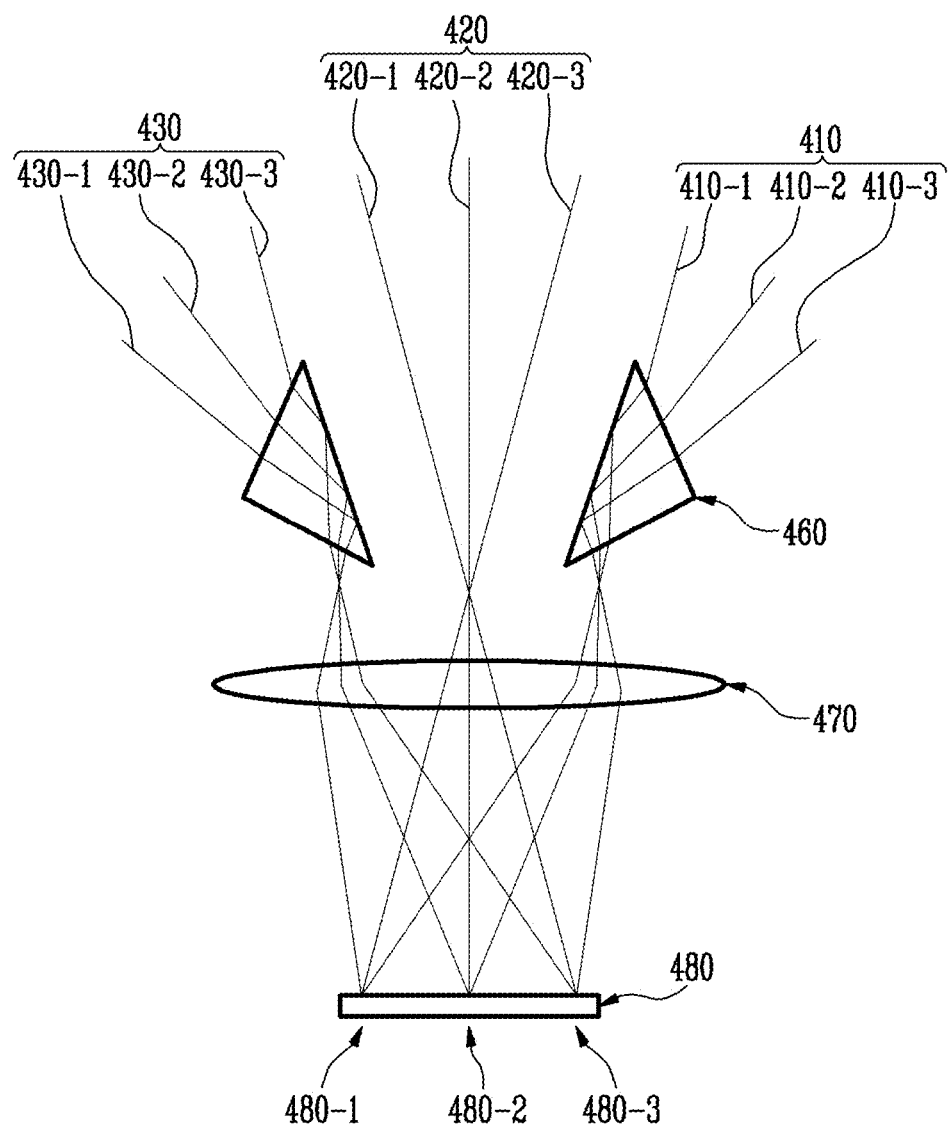
FIG. 4 is a conceptual diagram illustrating an active imaging system according to an exemplary embodiment of the present invention.

FIG. 4 is a conceptual diagram illustrating an active imaging system according to an exemplary embodiment of the present invention.

FIG. 4 discloses a method of generating an image based on scanning of a laser for divided imaging regions. FIG. 4 discloses an example of the case where a whole imaging region is divided into three divided imaging regions.

Referring to FIG. 4, the laser beam may be irradiated to three divided imaging regions 410, 420, and 430 by a scanning method. For example, the respective divided imaging regions 410, 420, and 430 may be scanned by sequentially scanning the laser beam.

The image generating unit may receive reflected light reflected from each of the divided imaging regions 410, 420, and 430 and generate an image for the whole imaging region.

When the laser beam is irradiated to a first divided imaging region (for example, the right region 410), light reflected and entering from the first divided imaging region 410 at three angles 410-1, 4102, and 410-3 may pass through a prism 460, and be detected by pixels 480-1, 480-2, and 480-3 of an image sensor 480 of an image generating unit through a lens 470.

The pixel 480-2 at a center of the image sensor may also detect light entering from a third divided imaging region (for example, the left region 430) and the second divided imaging region (for example, the center region 420) at center angles 420-2 and 430-2. However, when the laser irradiates the beam only to the first divided imaging region 410, signals entering from the second divided imaging region 420 and the third divided imaging region 430 are very weaker than that of reflected light reflected from the first divided imaging region 410. Accordingly, when the laser irradiates the beam only to the first divided imaging region 410, the image generating unit may obtain only an image for the first divided imaging region 410. The image for the first divided imaging region 410 may be called a first divided image. The first divided image may be stored in a memory of the image generating unit.

The laser may irradiate the beam to the second divided imaging region 420 in the active imaging system by using the aforementioned method. The reflected light for the second divided imaging region 420 may be transmitted to the image generating unit, so that a second divided image is generated, and the generated second divided image may be stored in the memory. Similarly, the laser may irradiate the beam to the third divided imaging region 430 in the active imaging system. The reflected light for the third divided imaging region 430 may be transmitted to the image generating unit, so that a third divided image is generated, and the generated third divided image may be stored in the memory.

One whole image may be generated based on the obtained first divided image, second divided image, and third divided image. Various methods may be used for the method of generating the whole image based on the respective divided images. For example, each divided imaging region may be divided so as to partially overlap another divided imaging region. The first divided image, the second divided image, and the third divided image obtained by the method may have overlapping regions, and the whole image may be obtained through data overlapping for the overlapping portions of the divided images. The overlapping of the data may be performed by, for example, a method of calculating an average value for values of the plurality of pixels. Otherwise, one whole image may be generated by summing the plurality of divided images in consideration of continuity of information for each image, such as information on an edge of each divided image. Otherwise, the respective divided images may be combined through a statistical analysis of the pixel values.

In comparing the active imaging system according to the exemplary embodiment of the present invention and an existing imaging system, the whole image obtained by the active imaging system according to the exemplary embodiment of the present invention is an image having the same FOV, but the FOV, which is actually used in the active imaging system, is only ⅓ of the existing FOV. Accordingly, the existing imaging system requires three image sensors, but when the imaging obtaining method according to the exemplary embodiment of the present invention is used, the image may be obtained by using only one image sensor, that is, the image sensor having a size of ⅓ of the existing image sensor.

Figure 5:
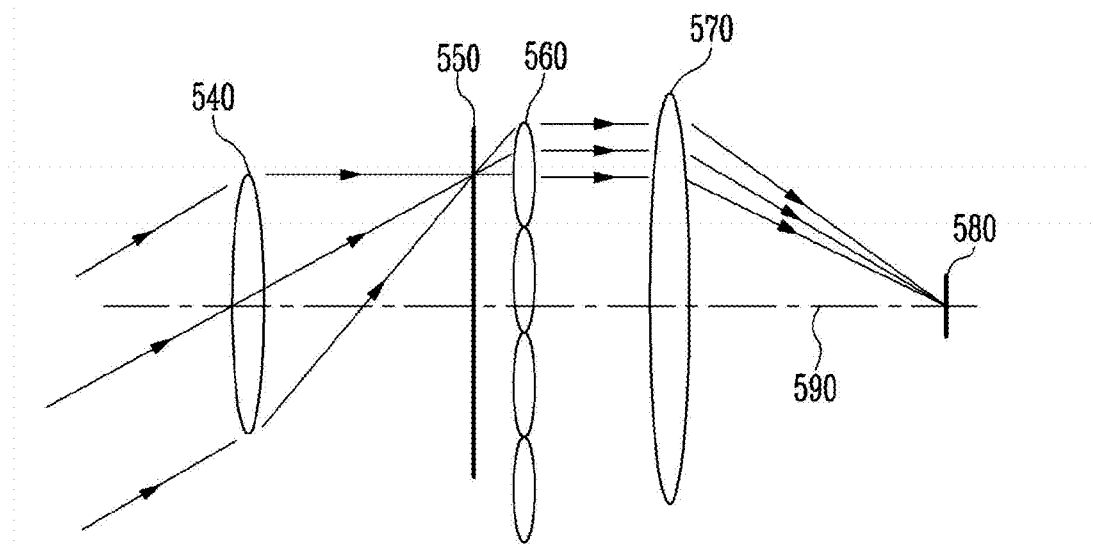
FIG. 5 is a conceptual diagram illustrating a method of generating an image based on a beam spot according to an exemplary embodiment of the present invention.

FIG. 5 is a conceptual diagram illustrating a method of generating an image based on beam spots according to an exemplary embodiment of the present invention.

FIG. 5 discloses a method of obtaining an image by setting beam spots for the image to be obtained, and irradiating a laser to beam spots as illustrated in FIG. 3. The beam spot may also be considered as one divided imaging region.

Referring to FIG. 5, light incident by a first lens 540 at a predetermined angle may form a focus at a focal surface 550 of the first lens. Individual micro lenses of a micro lens array 560 may be positioned to be spaced apart from the focal surface 550 of the first lens 540 by a focal distance of a micro lens. The light incident through the first lens 540 may be refracted so as to be parallel to a center axis of the imaging system through the micro lens.

Light moving in a horizontal direction with respect to a center axis 590 of the imaging system by the micro lens may be focused to an imaging sensor by a second lens 570. The image sensor 580 may be positioned on a focal surface of the second lens 570. In order for the light incident to the first lens 540 to arrive up to the image sensor 580, the focus generated by the first lens 540 needs to be formed with the same height as that of the center of each micro lens. Light incident to the first lens 540 with an angle so that a focus is formed with a different height from that of the center of the micro lens cannot enter the image sensor by the second lens 570.

Accordingly, the imaging system illustrated in FIG. 5 does not receive light at all of the angles within the FOV incident to the first lens 540, but selectively receives only light at a specific angle. The active imaging system according to the exemplary embodiment of the present invention may be implemented by arranging micro lens in accordance with angles of the beam spots of the laser. Otherwise, the active imaging system according to the exemplary embodiment of the present invention may obtain an image by setting a position of a laser beam spot according to a light angle of selectively received light of the micro lens array 560 and scanning the imaging region.

In the active imaging system, information on an angle of the reflected and returned light may be recognized from information on the position of the laser beam spot. Accordingly, the image sensor 580 of the active imaging system does not need to be configured by several pixels, and it is enough to use only a single detector.

FIG. 5 is a conceptual diagram illustrating light incident to the active imaging system according to the exemplary embodiment of the present invention.

Figure 6:
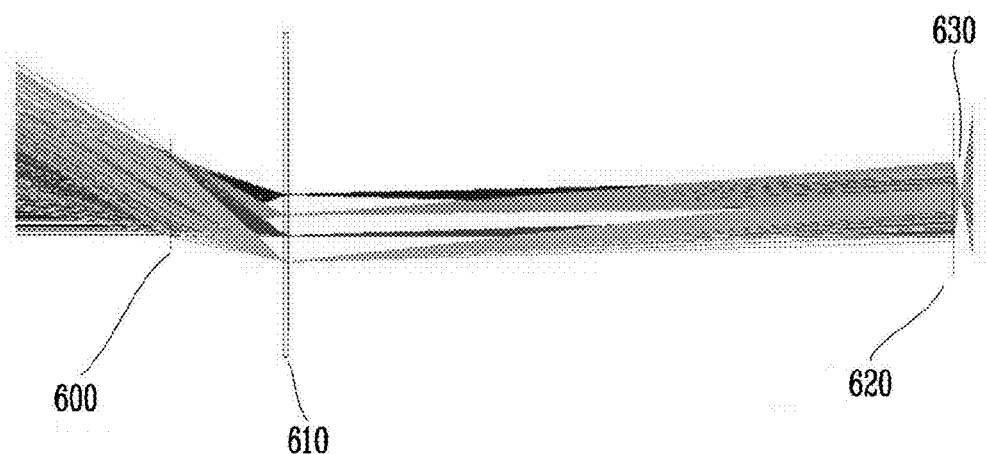
FIG. 6 is a conceptual diagram illustrating light incident to the active imaging system according to the exemplary embodiment of the present invention.

FIG. 6 illustrates ray tracing of a trace of light incident to the active imaging system disclosed in FIG. 5.

It is assumed that a first lens 600 has a focal distance of 35 mm and a size of an aperture of 12.5 mm. It is assumed that in a micro lens array 610 including a plurality of micro lens, lens having a radius curvature of 60 μm are arranged at an interval of 0.1 mm, and a second lens 620 has a focal distance of 2 mm, and an image sensor has a diameter of 0.2 mm.

Referring to FIG. 6, light reflected and incident from a first beam spot may be focused to a first micro lens through the first lens 600. In order for the light reflected and incident from the first beam spot to be focused to the first micro lens through the first lens 600, a focus generated by the first lens 600 needs to be formed to have the same height as that of the center of each micro lens. Light moving in a horizontal direction with respect to a center axis of the imaging system by the first micro lens may be focused to an imaging sensor 630 by the second lens 620. An image obtained by the image sensor 630 of the image generating unit based on the first micro lens may be referred to a first divided image. The first divided image may be stored in a memory of the image generating unit.

Further, light reflected and incident from a second beam spot may be focused to a second micro lens through the first lens 600. In order for the light reflected and incident from the second beam spot to be focused to the second micro lens through the first lens 600, a focus generated by the first lens 600 needs to be formed to have the same height as that of the center of each micro lens. Light moving in a horizontal direction with respect to the center axis of the imaging system by the second micro lens may be focused to the imaging sensor 630 by the second lens 620. An image obtained by the image sensor 630 of the image generating unit based on the second micro lens may be referred to a second divided image. The second divided image may be stored in a memory of the image generating unit.

The active imaging system may generate a third divided image and a fourth divided image based on light reflected and incident from a third beam spot and a fourth beam spot. The first to fourth divided images may form one whole image.

That is, in the exemplary embodiment of the present invention, it is possible to obtain a whole image by scanning the plurality of beam spots without increasing a size of the image sensor.

Figure 7:
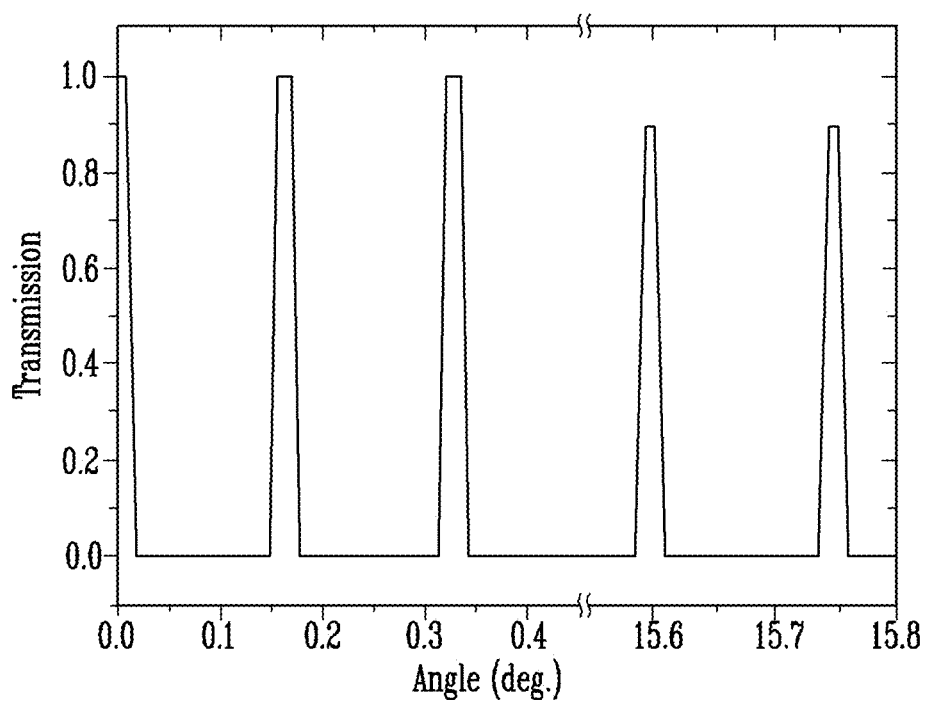
FIG. 7 is a diagram illustrating an intensity of light reaching an image sensor of the active imaging system according to the exemplary embodiment of the present invention.

FIG. 7 is a diagram illustrating an intensity of light reaching the image sensor of the active imaging system according to the exemplary embodiment of the present invention.

FIG. 7 illustrates calculation of an intensity of light, which reaches the image sensor having a diameter of 0.2 mm from the first lens of the active imaging system, for each incident angle. Referring to the graph of FIG. 7, it can be seen that imaging may be performed on regions even at the full angle of 30°.

The existing active imaging system requires the image sensor having a size of about 180 mm when having a focal distance of 35 mm, in order to have the FOV of 30°. However, in the active imaging system according to the exemplary embodiment of the present invention, in order to obtain an image with the same FOV, the size of the image sensor may be very small. Further, since it is possible to use a single pixel, the system may be very simply configured.

Figure 8:
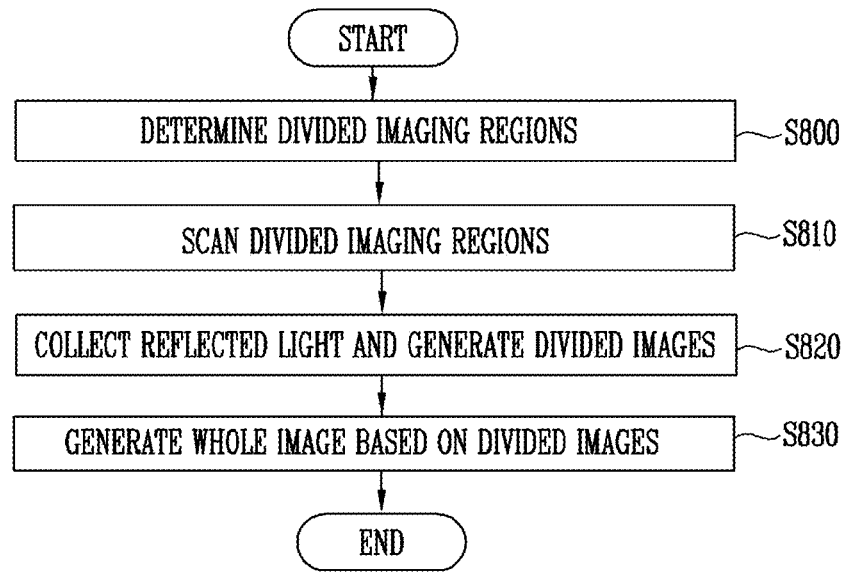
FIG. 8 is a flowchart illustrating a method of obtaining an image by the active imaging system according to an exemplary embodiment of the present invention.

FIG. 8 is a flowchart illustrating a method of obtaining an image by the active imaging system according to an exemplary embodiment of the present invention.

Referring to FIG. 8, divided imaging regions are determined by dividing an imaging region (operation S800).

The divided imaging region may be a region obtained by dividing the imaging region, of which an image is desired to be obtained by the active imaging system, or a beam spot region set according to the image desired to be obtained by the active imaging system.

For example, the image generating unit included in the active imaging system may determine a whole imaging region desired to be obtained, and divide the whole imaging region. When the image generating unit cannot move, the divided imaging regions may be determined in consideration of a scanning range of the beam of the laser. For another example, when the image is generated by the beam spot, a position of a beam spot may be determined in consideration of an arrangement of the micro lens included in the active imaging system, a light angle of selective light reception of the micro lens array, and the like. The active imaging system may transmit information on the divided imaging regions to the laser. The information on the divided imaging regions may include information on a position to which the laser needs to irradiate a beam through a movement, such as rotation, or information on a rotation angle of the laser.

Scanning is performed on the divided imaging regions based on the laser beam (operation S810).

For example, the information on the divided imaging regions obtained in operation S800 may be transmitted to the laser. The laser may scan the respective divided imaging regions based on the information on the divided imaging regions. The laser may irradiate a laser beam to the respective divided imaging regions for a predetermined time.

Divided images are generated by collecting reflected light of the respective divided imaging regions (operation S820).

For example, the image generating unit may generate the divided images of the respective divided imaging regions based on the beam irradiated by the laser. The generated divided images may be stored in the memory.

A whole image is generated based on the divided images (operation S830).

The divided images obtained in the respective divided imaging regions may be stored in the memory, and the whole image may be generated based on the divided images stored in the memory.

Various methods may be used for the method of generating the whole image based on the respective divided images. For example, each divided imaging region may be divided so as to partially overlap another divided imaging region. Accordingly, the respective divided images may have overlapping regions. The whole image may be obtained through data overlapping for the overlapping portions of the divided images. The overlapping of the data may be performed by, for example, a method of calculating an average value for values of the plurality of pixels. Otherwise, one whole image may be generated by summing the plurality of divided images in consideration of continuity of information for each image, such as information on an edge of each divided image. Otherwise, the respective divided images may be combined through a statistical analysis of the pixel values.

In the imaging method by using laser scanning, which divides a region of interest into a plurality of small regions and scans small regions with the laser beam, it is possible to recognize a part or whole of location information on an object by a scanning angle of the laser, so that it is possible to decrease the number of pixels of the image sensor, and decrease a size of the image sensor. Further, images of the small regions, to which the laser beam is irradiated, are combined and overlap in one image sensor by using a prism or the micro lens array, so that it is possible to decrease the number of pixels of the image sensor and decrease a size of the image sensor. Further, in the application such as a laser radar, a detector of the image sensor needs to detect a light output having a very short pulse width, so that the detector demands a low capacitance so as to be operated at a high speed. According to the exemplary embodiment of the present invention, it is possible to decrease a size of the detector of the image sensor, thereby achieving a high speed operation.

That is, it is possible to divide a region of interest into a plurality of small regions and scan the small regions with a laser beam by using the active imaging system according to the exemplary embodiment of the present invention. Accordingly, the image sensor is combined without being divided for the respective small regions, thereby implementing a small and simple image sensor.

Figure 9:
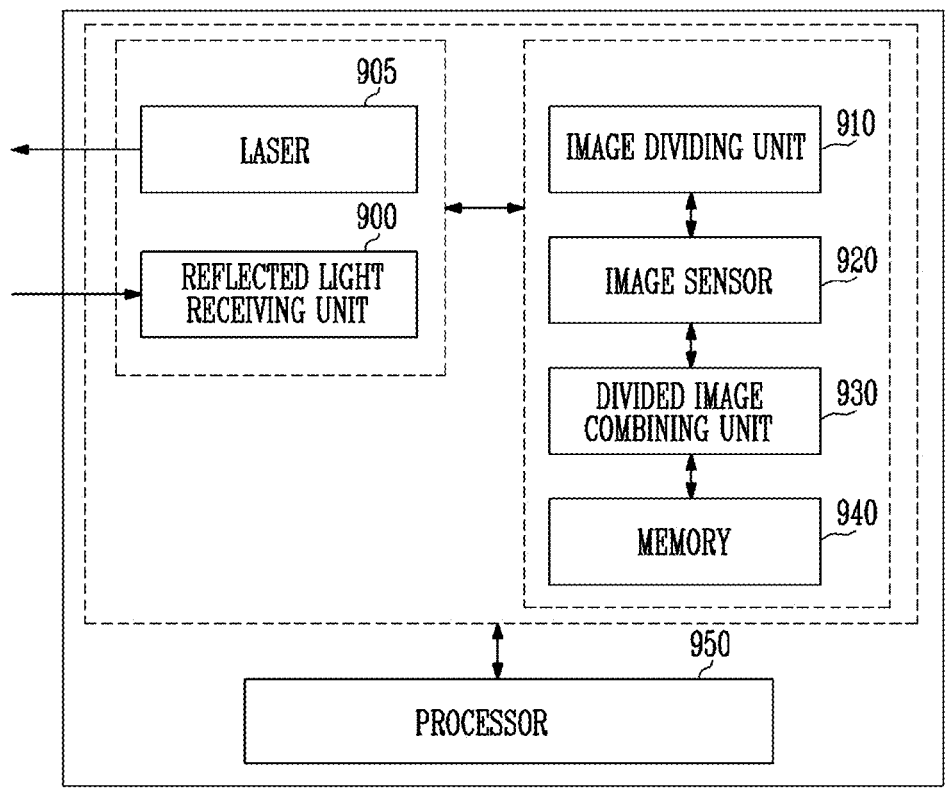
FIG. 9 is a diagram illustrating a concept of an active imaging system according to an exemplary embodiment of the present invention.

FIG. 9 is a diagram illustrating a concept of an active imaging system according to an exemplary embodiment of the present invention.

In FIG. 9, it is assumed that a laser and an image generating unit are implemented as one configuration unit in the active imaging system for convenience of description. The laser and the imaging generating unit may be separately implemented.

The laser and the imaging generating unit may perform an operation of the active imaging system according to the exemplary embodiments of the present invention disclosed in FIGS. 2 to 8. An operation of each constituent element will be exemplarily described below.

Referring to FIG. 9, the active imaging system may include a laser and an imaging generating unit, and the image generating unit may include a laser 905, a reflected light receiving unit 900, an image dividing unit 910, an image sensor 920, a divided image combining unit 930, a memory 940, and a processor 950.

The laser 905 may irradiate pulse light to an imaging region. The laser 905 may scan a whole imaging region by irradiating the pulse light to respective divided imaging regions. For example, the laser 905 obtains information on the divided imaging regions from the imaging dividing unit 910 to be described below, and irradiate the pulse light to the respective divided imaging regions. The information on the divided imaging regions may also include location information on each divided imaging region, information about a demanded movement of the laser 905 (for example, a rotation angle), and/or information on a scanning time.

The reflected light receiving unit 900 may be implemented so as to receive reflected light of the light which the laser 905 irradiates to the divided imaging regions.

The image dividing unit 910 may divide the imaging region, and set the divided imaging regions (for example, beam spots). When the image generating unit cannot move, the image dividing unit 910 may determine the divided imaging regions in consideration of a scanning range of the beam of the laser 905. For another example, when the image is generated by the beam spot, the image dividing unit 910 may determine a position of a beam spot in consideration of an arrangement of the micro lens included in the active imaging system, a light angle of selective light reception of the micro lens array, and the like.

The image dividing unit 910 may divide the imaging region, and then transmit information on the divided imaging regions to the laser 905. The information on the divided imaging regions may include information on a position to which the laser 905 needs to irradiate a beam through a movement, such as rotation, or information on a rotation angle of the laser. When the image generating unit and the laser 905 are implemented as different constituent element, a communication unit may be implemented to transmit the information on the divided imaging regions through communication between the image generating unit and the laser 950.

The image sensor 920 may generate the divided images based on the information on the reflected light from the respective divided imaging regions received through the reflected light receiving unit 900. According to the exemplary embodiment of the present invention, the laser 905 may transmit the beam to the respective divided imaging regions on which the scanning is performed, and the image sensor 920 may obtain the reflected light of the respective divided imaging regions. It is possible to generate divided images for the respective divided imaging regions based on the information on the reflected light from the respective divided imaging regions.

The divided image combining unit 930 may combine the respective divided images, and generate a whole image for the imaging region. As described above, in order to generate the whole image by combining the divided images, various methods may be used.

The memory 940 may be implemented so as to store the divided images for the respective divided imaging regions.

The processor 950 may be implemented so as to control the operations of the laser 905, the reflected light receiving unit 900, the image dividing unit 910, the image sensor 920, the divided image combining unit 930, and the memory 940.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A method of obtaining an image of an imaging region using an active imaging system that includes
    a laser, and
    an image generation device including an image sensor, the image sensor having a limited Field of View (FoV) that is smaller than an FoV required for the image sensor to capture the entire image region,
the method comprising:
    irradiating a beam of the laser sequentially to a plurality of portions of the imaging region;
    using the image generation device without mechanical move thereof, to refract light reflected sequentially from the plurality of portions of the imaging region, and to receive the sequentially refracted light; and
    generating, using the image generation device, a plurality of sequential images based on the sequentially refracted light, and generating the image of the imaging region based on the plurality of sequential images and sequential angular information of the beam, wherein
    the sequential images are generated by sequentially irradiating the beam at a plurality of angles respectively to the plurality of portions of the imaging region, and
    the reflected light is refracted through a prism in the image generation device.

2. The method of claim 1, wherein
the plurality of portions of the imaging region correspond to a plurality of beam spots, and
the plurality of beam spots is determined according to a desired number of pixels and disposition of the image of the imaging region.

3. The method of claim 1, wherein the image sensor is formed of a plurality of pixels, and obtains each sequential image according to a scanning angle of the beam of the laser.

4. A method of obtaining an image of an imaging region using an active imaging system that includes
    a laser, and
    an image generation device including an image sensor, the image sensor having a limited Field of View (FoV) that is smaller than an FoV required for the image sensor to capture the entire image region,
the method comprising:
    irradiating a beam of the laser sequentially to a plurality of portions of the imaging region;
    using the image generation device without mechanical move thereof, to refract light reflected sequentially from the plurality of portions of the imaging region, and to receive the sequentially refracted light; and
    generating, using the image generation device, a plurality of sequential images based on the sequentially refracted light, and generating the image of the imaging region based on the plurality of sequential images and sequential angular information of the beam, wherein
    the plurality of portions of the imaging region correspond to a plurality of beam spots, and
    a the image generation device further includes a first lens, a micro lens array and a second lens, light incident through the first lens being refracted to be incident to one micro lens included in the micro lens array, the one micro lens refracting the incident light to be parallel to a center axis of the active imaging system, and the second lens causing the light refracted from the one micro lens be focused to the image sensor.

5. An active imaging system for obtaining an image of an imaging region, comprising:
    a laser configured to irradiate a beam sequentially to a plurality of portions of the imaging region; and
    an image generating unit including an image sensor, which has a limited Field of View (FoV) that is smaller than an FoV required for the image sensor to capture the entire image region, the image generating unit being configured to
        refract light reflected sequentially from the plurality of portions of the imaging region,
        receive the sequentially reflected light,
        generate a plurality of sequential images based on the sequentially refracted light, and
        generate the image of the imaging region based on the plurality of sequential images and sequential angular information of the beam,
without mechanical move of the image generating unit, wherein
    the laser sequentially irradiates the beam at a plurality of angles respectively to the plurality of portions of the imaging region, and
    the image generating unit further includes a prism through which the reflected light is refracted.

6. The active imaging system of claim 5, wherein
the plurality of portions of the imaging region correspond to a plurality of beam spots, and
the plurality of beam spots is determined according to a desired number of pixels and disposition of the image of the imaging region.

7. The active imaging system of claim 5, wherein the image sensor is formed of a plurality of pixels, and obtains each sequential image according to a scanning angle of the beam of the laser.

8. An active imaging system for obtaining an image of an imaging region, comprising:
    a laser configured to irradiate a beam sequentially to a plurality of portions of the imaging region; and
    an image generating unit including an image sensor, which has a limited Field of View (FoV) that is smaller than an FoV required for the image sensor to capture the entire image region, the image generating unit being configured to
        refract light reflected sequentially from the plurality of portions of the imaging region,
        receive the sequentially reflected light, generate a plurality of sequential images based on the sequentially refracted light, and generate the image of the imaging region based on the plurality of sequential images and sequential angular information of the beam, without mechanical move of the image generating unit, wherein the plurality of portions of the imaging region correspond to a plurality of beam spots, and the image generation device further includes a first lens, a micro lens array and a second lens, light incident through the first lens being refracted to be incident to one micro lens included in the micro lens array, the one micro lens refracting the incident light to be parallel to a center axis of the active imaging system, and the second lens causing the light refracted from the one micro lens be focused to the image sensor.

* * * * *